US008935785B2

(12) United States Patent
Pandrangi (10) Patent No.: US 8,935,785 B2
(45) Date of Patent: Jan. 13, 2015

(54) IP PRIORITIZATION AND SCORING SYSTEM FOR DDOS DETECTION AND MITIGATION

(75) Inventor: Ramakant Pandrangi, Vienna, VA (US)

(73) Assignee: Verisign, Inc, Reston, VA (US)

( * ) Notice: Subject to any disclaimer, the term of this patent is extended or adjusted under 35 U.S.C. 154(b) by 88 days.

(21) Appl. No.: 13/243,714

(22) Filed: Sep. 23, 2011

(65) Prior Publication Data

US 2012/0079592 A1  Mar. 29, 2012

Related U.S. Application Data

(60) Provisional application No. 61/386,391, filed on Sep. 24, 2010, provisional application No. 61/386,639, filed on Sep. 27, 2010.

(51) Int. Cl.
*H04L 29/06* (2006.01)
*G06F 15/16* (2006.01)
*H04L 12/801* (2013.01)

(52) U.S. Cl.
CPC ............ *H04L 47/10* (2013.01); *H04L 63/0227* (2013.01); *H04L 63/1416* (2013.01); *H04L 63/1458* (2013.01)
USPC ........................................... 726/23; 709/224

(58) Field of Classification Search
None
See application file for complete search history.

(56) References Cited

U.S. PATENT DOCUMENTS

| | | | | |
|---|---|---|---|---|
| 7,039,951 | B1 * | 5/2006 | Chaudhari et al. ................. | 726/7 |
| 7,225,468 | B2 * | 5/2007 | Waisman et al. ............... | 726/23 |
| 7,464,407 | B2 * | 12/2008 | Nakae et al. .................... | 726/22 |
| 7,849,502 | B1 * | 12/2010 | Bloch et al. ..................... | 726/11 |
| 8,037,144 | B2 * | 10/2011 | Lund et al. .................... | 709/206 |
| 8,250,657 | B1 * | 8/2012 | Nachenberg et al. ........... | 726/25 |
| 8,312,536 | B2 * | 11/2012 | Nachenberg et al. ........... | 726/22 |
| 8,312,537 | B1 * | 11/2012 | Nachenberg et al. ........... | 726/22 |
| 8,621,233 | B1 * | 12/2013 | Manadhata et al. .......... | 713/188 |
| 8,826,426 | B1 * | 9/2014 | Dubey ............................ | 726/22 |

(Continued)

FOREIGN PATENT DOCUMENTS

| | | |
|---|---|---|
| EP | 2 109 281 | 10/2009 |
| EP | 2 109 282 | 10/2009 |

(Continued)

OTHER PUBLICATIONS

International Search Report and the Written Opinion, PCT/US2011/053051, Nov. 25, 2011.

(Continued)

*Primary Examiner* — Christopher Revak
(74) *Attorney, Agent, or Firm* — MH2 Technology Law Group, LLP (57) ABSTRACT

A method and system to mitigate an attack over the Internet includes collecting information related to a plurality of client IP addresses from a plurality of sources and analyzing the collected information to determine confidence scores for the plurality of client IP addresses. The method and system also include receiving network traffic from the Internet and limiting network traffic from a first subset of the plurality of client IP addresses characterized by a confidence score less than a first threshold. The method, and system further include determining a level of the network traffic and limiting network traffic from a second subset of the plurality of client IP addresses characterized by a confidence score less than a second threshold greater than the first threshold.

24 Claims, 4 Drawing Sheets

(56) References Cited

U.S. PATENT DOCUMENTS

| | | | |
|---|---|---|---|
| 8,826,444 B1* | 9/2014 | Kalle | 726/26 |
| 2005/0195840 A1 | 9/2005 | Krapp et al. | |
| 2005/0259645 A1 | 11/2005 | Chen et al. | |
| 2006/0174324 A1 | 8/2006 | Zur et al. | |
| 2006/0212931 A1* | 9/2006 | Shull et al. | 726/10 |
| 2007/0266426 A1 | 11/2007 | Lyengar et al. | |
| 2008/0082662 A1* | 4/2008 | Dandliker et al. | 709/225 |
| 2008/0172739 A1* | 7/2008 | Nakae et al. | 726/22 |
| 2008/0256622 A1 | 10/2008 | Neystadt et al. | |
| 2008/0282339 A1* | 11/2008 | Nakae et al. | 726/13 |
| 2009/0007266 A1 | 1/2009 | Wu et al. | |
| 2009/0013404 A1 | 1/2009 | Chow et al. | |
| 2009/0328209 A1* | 12/2009 | Nachenberg | 726/22 |
| 2011/0040825 A1* | 2/2011 | Ramzan et al. | 709/203 |
| 2012/0036110 A1* | 2/2012 | Byrne et al. | 707/687 |
| 2012/0167210 A1* | 6/2012 | Oro Garcia et al. | 726/22 |
| 2013/0007870 A1* | 1/2013 | Devarajan et al. | 726/11 |
| 2013/0007882 A1* | 1/2013 | Devarajan et al. | 726/24 |

FOREIGN PATENT DOCUMENTS

| | | | | |
|---|---|---|---|---|
| EP | 2109282 A1 * | 10/2009 | | H04L 29/06 |
| WO | 2005116851 A2 | 12/2005 | | |
| WO | WO 2008/052291 | 5/2008 | | |
| WO | WO 2009/042899 | 4/2009 | | |

OTHER PUBLICATIONS

Extended European Search Report dated Feb. 17, 2014, issued in European Application No. 13199232.3 filed Dec. 20, 2013, 6 pages.

* cited by examiner

IP PRIORITIZATION AND SCORING SYSTEM FOR DDOS DETECTION AND MITIGATION

This application claims the benefit of U.S. Provisional Application No. 61/386,391, filed Sep. 24, 2012, and U.S. Provisional Application No. 61/386,639, filed Sep. 27, 2010, both of which are incorporated herein by reference in their entirety.

TECHNICAL FIELD

This disclosure generally relates to Internet security. In particular, this disclosure relates to the detection, handling, and analysis of distributed denial-of-service (DDoS) attacks.

BACKGROUND

A DDoS attack is an attempt to make a computer resource unavailable to its intended users. Generally, a DDoS attack includes a concerted effort to prevent an Internet site or service from functioning. Perpetrators of DDoS attacks typically target sites or services hosted on web servers such as banks, credit card payment gateways, and even root nameservers. Improved methods and techniques to detect and mitigate DDoS attacks are needed.

Most DDoS mitigation systems use whitelists and blacklists and a combination of packet inspection to mitigate malicious traffic while minimizing impact to legitimate clients. This approach does not allow any modularity with a class of addresses. For example, in a particular request, the source IP address is not defined, blacklisted, or whitelisted. If an attack is underway, a policy may be to disallow all unknown or undefined traffic and only allow whitelisted traffic. This approach does not allow much granularity in setting traffic policies.

SUMMARY

Embodiments of the present application provide a system with more versatility than available using whitelists and blacklists by applying thresholds gradually. The mitigation system described herein can use information in a more granular manner to determine which traffic to filter or allow through.

According to an embodiment, a system for detection and mitigation of DDoS attacks is provided. In a particular embodiment, the system makes use of knowledge acquired and stored before the event and allows a more versatile approach to mitigation. Some embodiments utilize an IP prioritization technique that allows for thresholds to be applied at different confidence levels as described below.

In contrast with the conventional blacklist/whitelist approach, embodiments utilize various types of data to determine a variable confidence score for individual IP addresses. The sources can be weighted in computing the confidence scores. The data analyzed can include, but is not limited to, historical data about the IP address, current data related to the network traffic associated with the IP address, a comparison between as current services being obtained by the IP address with historically obtained services, and the like. Other data that can be analyzed includes any other identifiers to identify the source machine, including without limitation, a combination of IP addresses, cookies, and fingerprinting techniques. By utilizing these diverse sources of data to analyze source IP addresses at the individual client level, the traffic originating from a particular IP address can be managed with a high level of granularity. In addition to dropping network packets from a suspicious IP address, the detailed score developed for each IP address enables the system operator to sequentially increase the level of filtering using the confidence scores.

Embodiments provide a method of analyzing client IP addresses, assigning confidence scores to the client IP addresses based on a plurality of sources, and utilizing a structured approach to sequentially block higher levels of traffic based on the confidence scores. Thus, embodiments provide methods and systems for implementing DDoS attack and mitigation in fraud detection systems. Embodiments enable a network services provider to offer DDoS mitigation services by assessing threats more accurately and with fewer false positives.

Embodiments relate to a product for detection and mitigation of distributed denial of service (DDoS) attacks. The system makes use of knowledge that has been collected and analyzed prior to the DDoS attack and employs a more versatile approach to mitigation than conventional techniques. These and other embodiments along with many of its features are described in more detail in conjunction with the text below and attached figures.

Methods and systems are described to control network traffic based on confidence scores. Threshold values are determined, where each threshold value would correspondingly create a subset of confidence score ranges. When a request is received from a particular IP address, the confidence score applicable to that IP address is determined and compared to the threshold values. The request is processed according to where the IP address falls in the subset of confidence scores, as determined by the threshold values.

A method of computing a confidence score for an IP address is disclosed where the method stores information about the IP address, analyzes the stored information, and computes a confidence score based on the stored information.

A method and system of mitigating an attack over the Internet is disclosed where the method calculates confidence scores, receives network traffic over the Internet, and limits the network traffic based on the confidence scores of the client IP address and a first threshold as determined by a confidence score. The level of network traffic is determined and adjusted by limiting the network traffic of a second subset of client IP addresses based on a confidence score less than a second threshold, where the second threshold is greater than the first threshold.

It is to be understood that both the foregoing general description and the following detailed description are exemplary and explanatory only and are not restrictive of the application, as claimed.

The accompanying drawings, which are incorporated in and constitute a part of this specification, illustrate embodiments of the application and together with the description, serve to explain the principles of the application.

DETAILED DESCRIPTION

Reference will now be made in detail to the exemplary embodiments. Wherever possible, the same reference numbers will be used throughout the drawings to refer to the same or like parts.

Figure 1:
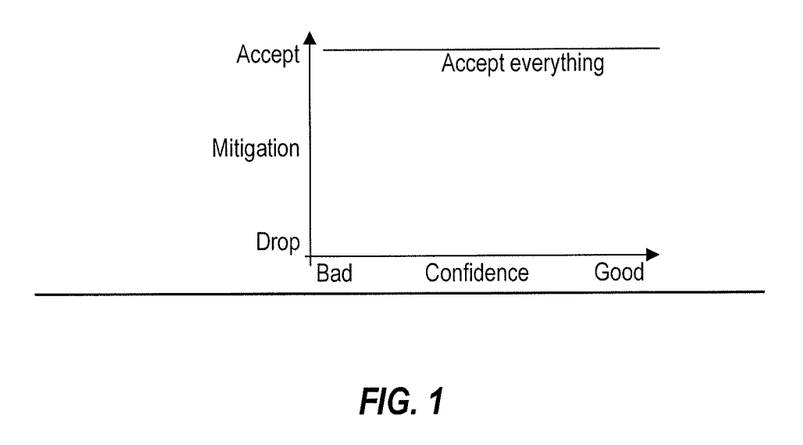
FIG. 1 is an exemplary simplified plot illustrating operation under normal circumstances according to an embodiment.
Figure 2:
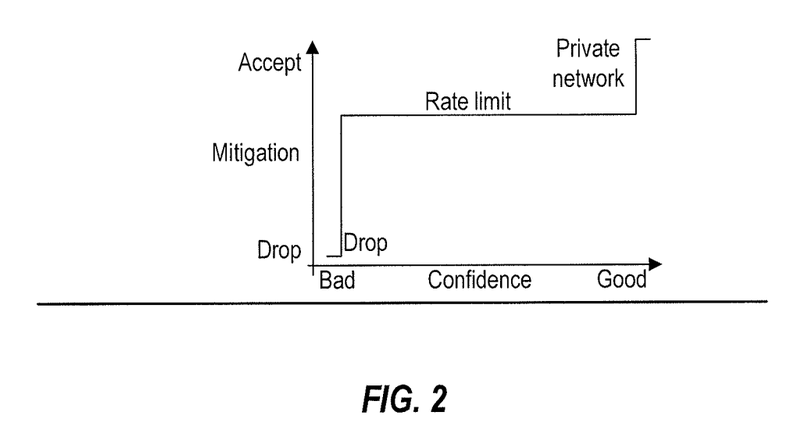
FIG. 2 is an exemplary simplified plot illustrating a first mitigation strategy according to an embodiment.

FIG. 1 is an exemplary simplified plot illustrating operation under normal circumstances. Under normal circumstances, all packets are accepted. FIG. 2 is a simplified plot illustrating a first mitigation strategy according to an embodiment. In this first mitigation strategy for use during a DDoS attack, packets that are known to be good (e.g., private network packets) are accepted and other traffic is rate limited. In some embodiments, packets that are known to be bad (e.g., present on a blacklist) are dropped.

Figure 3:
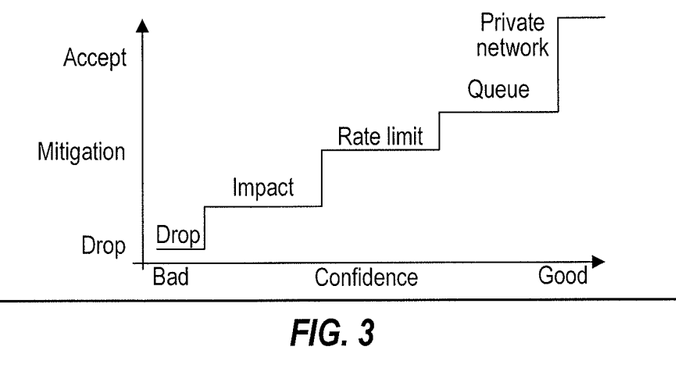
FIG. 3 is an exemplary simplified plot illustrating a mitigation technique utilizing thresholds according to an embodiment.

FIG. 3 is an exemplary simplified plot illustrating a mitigation technique utilizing thresholds according to an embodiment. Embodiments utilize multiple sources of information to build a pre-attack knowledge base at an individual client IP level. This information can be obtained and/or stored prior to the attack (also referred to as knowledge obtained before the event or attack). Multiple sources of information may be used to build information profiles before an event at an individual client IP level (e.g., client IP addresses represent one or more client/host machines). The client IP addresses represent one or more client/host machines. Aside from analyzing data from the client IP, other data that can be analyzed to identify one or more client/host machines includes any other identifiers to identify the source machine, including without limitation, a combination of IP addresses, cookies, and fingerprinting techniques. Therefore, one skilled in the art will understand that whereever the specification discloses "client IP," one may substitute or combine additional indentification indicia to help categorize and score identified client/host machines. This pre-attack knowledge base enables the system to generate a confidence score for individual IP addresses. Information about individual client IPs are gathered from multiple sources, including, but not limited to: network traffic information that is collected by using a combination of Netflow/SFlow information available from IPs, network traffic inspection based on information regarding known malicious IP addresses (blacklists), IP address to location mapping, the number of connections, the time of connections, or the like. These are merely examples of the information that can be used and are not intended to limit the scope of the present disclosure.

In addition, information regarding known malicious IP addresses (blacklists) can also be used as a feed into the system to increase knowledge regarding behavior of IP addresses. This information will be collected, correlated, and analyzed in both real time and off line to determine a confidence score for individual IP addresses. Additional characteristic and attributes related to IP addresses such as IP address to location mapping and the like, number of connections, time of connections, etc. can be generated and/or stored to perform additional analysis that can be used to determine a confidence level regarding the traffic originating from a particular IP address. The sources of information can be weighted so that the confidence scores that are computed can be varied depending on the quality of the underlying sources. The confidence score for the individual IP address is used in FIG. 3 to prioritize the packets from drop, to inspect, to rate limit, to queue, to accept. IP addresses with low confidence scores are thus restricted in comparison to IP addresses with high confidence scores. As illustrated in FIG. 3, thresholds are applied at different confidence levels using IP prioritization.

Detailed knowledge about clients allows a more versatile and structured approach to mitigation. Rather than a simple good/suspect/bad decision, embodiments use a more detailed score for each source client IP address to apply an individual rate limit or apply additional checks based on the knowledge possessed about that client. In addition, knowledge regarding current traffic being generated by a client can be used in the IP prioritization process. Lookups in a score table may be processed at wirespeed.

As an example, every IP address that has sent traffic over a period of time, for example, six months, can be tracked and based on how frequently each IP address has sent traffic, when everything was normal, and the confidence score for these IP addresses can be increased. Normal traffic from an IP address over time will tend to increase its confidence score. Each IP address can initially be assigned a default confidence score, for example, 50. If information is received about an IP address, for example, that the IP address is listed on a blacklist, the these IP addresses can receive an initial score that is lower than the default value, for example a starting score of 25 or less.

Embodiments enable a way of associating some trust with the information that has been received. Thus, for information aggregated from multiple sources, and based on that trust, the IP addresses are assigned a confidence score along a scale. The information from the blacklists is updated over time as the IP address interacts with the system, increasing utility from merely a binary drop/accept decision to a more granular technique. IP addresses with longer histories will typically have a higher confidence score and will, therefore, be preferentially passed during an attack in comparison with IP addresses with shorter histories. One of ordinary skill in the art would recognize many variations, modifications, and alternatives.

Figure 4:
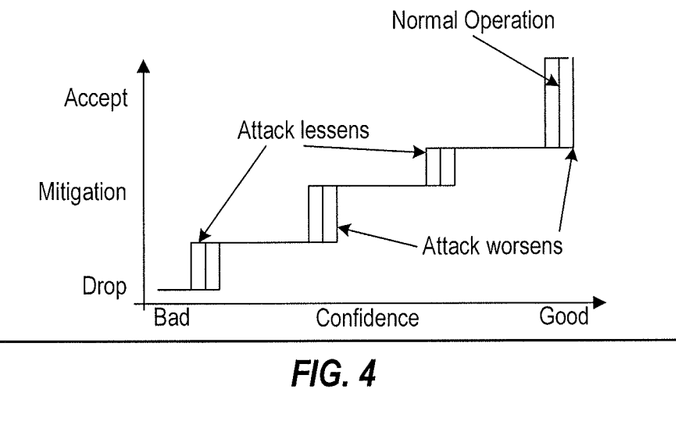
FIG. 4 is an exemplary simplified plot illustrating adjustment of the mitigation technique illustrated in FIG. 3 according to an embodiment.

FIG. 4 is an exemplary simplified plot illustrating adjustment of the mitigation technique illustrated in FIG. 3. During an attack, the thresholds for the various actions (e.g., drop, inspect, rate limit, queue, accept, and the like) are shifted such that the actions are applied at higher confidence levels. As illustrated in FIG. 4, during an attack, packets that were initially inspected can be rate limited as the curve shifts to the right. Thus, additional packets will be filtered in comparison with operation prior to the attack.

As the attack worsens, additional shifting of the threshold can be applied with additional packets filtered. As the attack lessens, the thresholds can be shifted to lower confidence levels, effectively accepting more packets and allowing more traffic at lower confidence levels to be passed through the network. The symmetric shifts illustrated in FIG. 4 are merely provided by way of example and are not intended to limit embodiments of the disclosure. One of ordinary skill in the art would recognize many variations, modifications, and alternatives. The technique illustrated in FIG. 4 is a combination of using the current attack traffic and correlating that traffic with the IP reputation that has been determined for the various IP addresses.

During an attack, traffic associated with lower ranked confidence scores can be blocked while ensuring that traffic from IP addresses that have been communicating regularly are passed. If an IP address with a high confidence score is sending a high level of traffic during an attack, the confidence score for the IP address can be decreased to a lower level. Thus, the IP prioritization can change as a function of time for a particular IP address.

Figure 5:
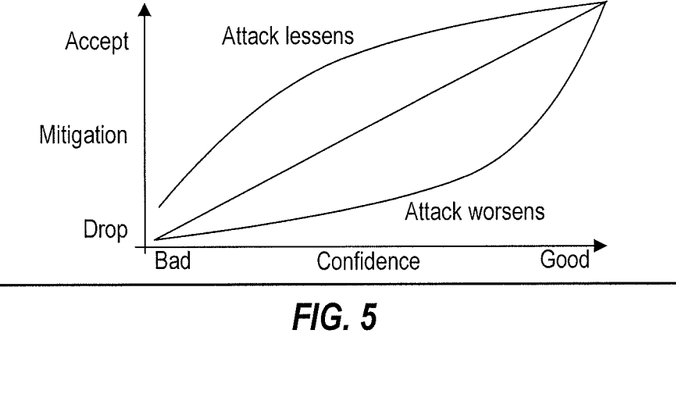
FIG. 5 is an exemplary simplified plot illustrating adjustment of another mitigation technique according to an embodiment.

FIG. 5 is an exemplary simplified plot illustrating adjustment of another mitigation technique according to an alternative embodiment. In the mitigation technique illustrated in FIG. 5, a linear threshold as a function of confidence level is applied and then shifted into a nonlinear curve as a function of the attack level. As the attack worsens, the threshold for accepting packets increases, enabling less traffic to pass through the network. As the attack lessens, the thresholds are decreased, enabling additional traffic to be passed through the network.

Figure 6:
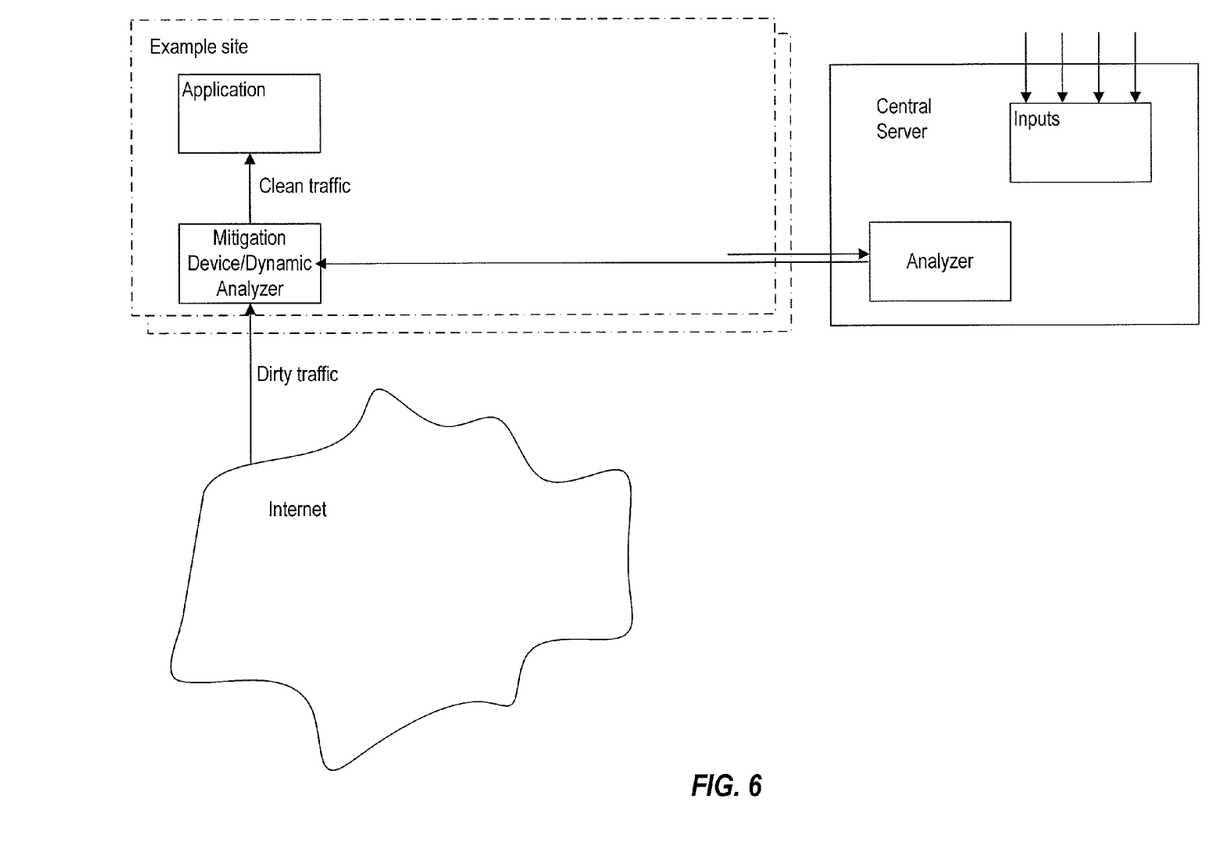
FIG. 6 is an exemplary simplified schematic diagram of a DDoS detection and mitigation system according to an embodiment.

FIG. 6 is an exemplary simplified schematic diagram of a DDoS detection and mitigation system according to another embodiment. As illustrated in FIG. 6, the DDoS detection and mitigation system includes a central server receiving inputs from multiple sources. Utilizing the data, a confidence score is computed, also referred to as a composite data score. The confidence score can be used in a site that filters traffic from the Internet to provide cleansed traffic.

Figure 7:
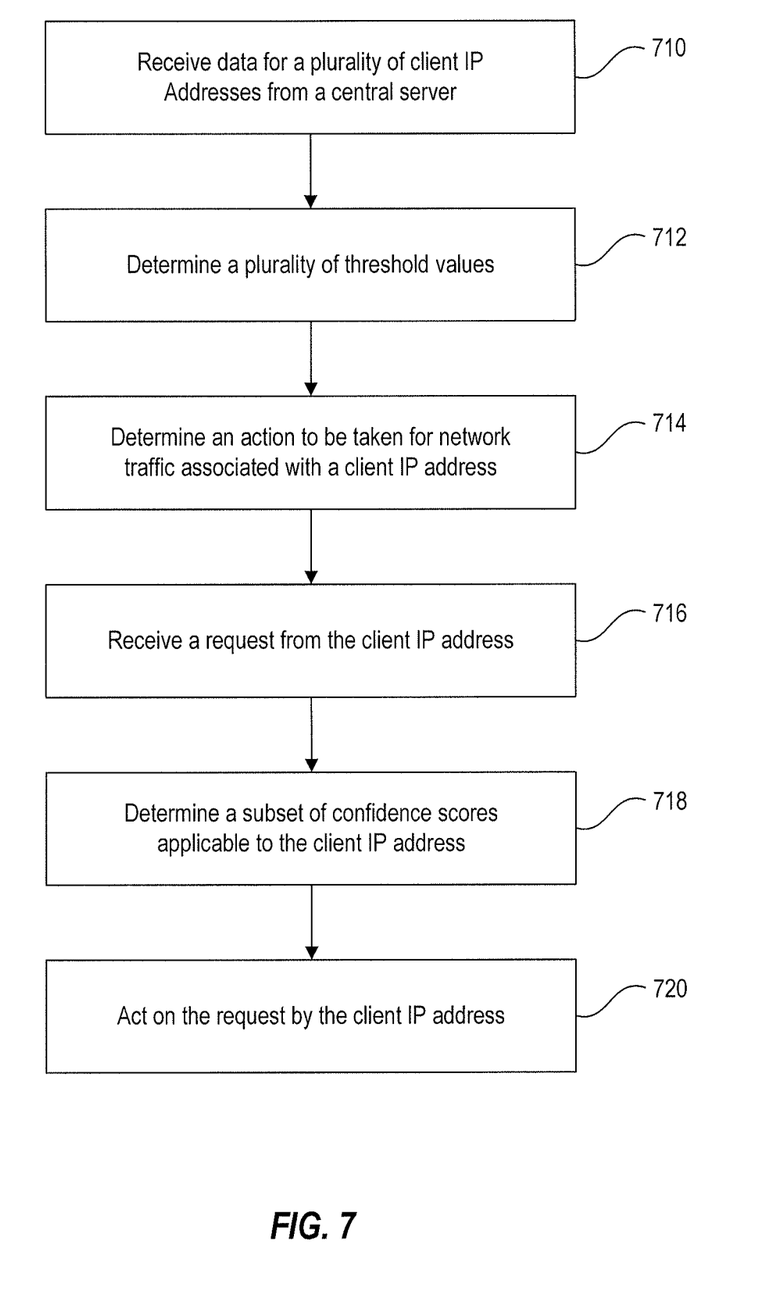
FIG. 7 is an exemplary simplified flowchart illustrating a method of detecting and mitigating a DDoS attack according to an embodiment.

FIG. 7 is an exemplary simplified flowchart illustrating a method of detecting and mitigating a DDoS attack according to still another embodiment. The method 700 includes receiving data for a plurality of client IP addresses from a central server (710). The data relates to a confidence score of each of the plurality of client IP addresses. The data relating to a confidence score received from the central server can include the confidence score. The method also includes determining a plurality of threshold values (712). The threshold values define a subset of confidence scores. The method further includes determining an action to be taken by a network server for network traffic originating from a client IP address with a confidence score in one of the subset of confidence scores (714) and receiving a request from the client IP address (716). Additionally, the method includes determining the subset of confidence scores that is applicable to the client IP address based on the received data associated with the client IP address (718) and acting on the request by the client IP address based at least in part on the subset of confidence scores to which the client IP address is assigned (720).

The threshold values may thus be adjusted based on current network traffic information. In a particular embodiment, the current network traffic information is evidence of an attack, and adjusting increases the threshold levels. As an example, a rate limit can be applied to the requests by an client IP address and an additional check can be performed on the request by that client IP network address. The confidence score may be calculated at the network server based in part on the data received from the central server.

Embodiments may utilize multiple sources of information including IP information. As an example, information could be provided from trusted sources (e.g., based on human intelligence) in the form of a list of IP addresses that are associated with infected machines, even if the history of interaction with these IP addresses is limited. Information could come from human intelligence sources, customers, a list of known IPs and aggregate information from these multiple sources to assign a confidence score to one or more of the IP addresses. The system operator can have a confidence level in the data source (i.e., a confidence value). The confidence scores for the IP addresses can be based, in part, on the confidence level in the data source as represented by a confidence level.

For some data sources, such as a provider of a blacklist that has not been examined by human intelligence, the confidence level in the data source can be less than certain. Since the confidence level in the source is less than certain, the confidence score can be increased in comparison with blacklists from more reliable sources, for which the IP addresses will have a lower confidence score in comparison. Thus, embodiments many utilize multiple sources of data and provide a system that reduces the chance of a false positives. Information from the data sources can be supplemented by history data as discussed above to arrive at or modify a confidence score since IP addresses associated with repeat customers are safer and will have a higher confidence score as a result.

As an example, a trusted customer may provide a whitelist including IP addresses. These IP addresses would initially be assigned a high confidence score because of the high confidence value associated with the trusted customer. As the IP addresses develop a history over time, the confidence scores can be raised or lowered as a function of the actions associated with the IP addresses.

Embodiments may utilize a feedback loop in which information is used to update confidence scores or add IP addresses to one or more lists based on the information. As an example, if a machine is detected as infected, the IP address associated with the machine could have its confidence score reduced. If the IP address was not previously present, it could be added to a database maintained as part of the system. For example, if a whitelist has not included an IP address, and a new client begins communication during a DDoS attack, the network traffic can be analyzed to determine that the client is malicious and the client can be blocked. The knowledge that the client has been blocked is then added to the database. Thus, as history develops for clients, a feedback loop is provided to increase the system knowledge about IP addresses for these clients.

As an example, a mitigation device may block traffic based of different criteria. A mitigation device can mitigate malicious traffic based on IP address, based on knowledge that the network signature is identified as malicious, or the like. According to embodiments, these initial indications are supplemented over time to provide a more granular insight into the likelihood of the traffic being malicious.

Other embodiments of the disclosure will be apparent to those skilled in the art from consideration of the specification and practice of the embodiments disclosed herein. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A method for controlling network traffic, comprising:
receiving, at a network server, client machine data for a plurality of client machines, the client machine data relating to a confidence score for each of the plurality of client machines, the client machine data comprising network traffic information, blacklist information, IP address to location mapping information, a number of connections information, and a time of connections information;
determining a plurality of threshold values;
relating each of the plurality of threshold values to an action to be taken for request network traffic;
receiving a request associated with a client machine, wherein the association is determined using identification data found in the request;

determining a confidence score associated with the client machine based on the client machine data; and acting on the request based on comparing the confidence score to the threshold values and related actions to be taken.

2. The method of claim 1 wherein the threshold values are adjusted based on current network traffic information.

3. The method of claim 2 wherein the current network traffic information is evidence of an attack, and the adjusting increases the threshold values.

4. The method of claim 1 wherein an action related to one or more of the threshold values comprises at least one of: applying a rate limit to the requests by the client machine or performing an additional check on the request by a client IP network address associated with the request.

5. The method of claim 1 wherein the data relating to a confidence score received from the central server includes the confidence score.

6. The method of claim 1 wherein the confidence score is calculated at the network server based in part on the data received from the central server.

7. The method of claim 1 wherein the identification data comprises client IP addresses and wherein the identification data found in the request comprises a client IP address associated with the request.

8. A method for computing a confidence score for an IP address, the method comprising:
storing information about a plurality of client IP addresses, the information comprising network traffic information, blacklist information, IP address to location mapping information, a number of connections information, and a time of connections information;
analyzing the stored information about the client IP addresses,
computing a confidence score for each of the plurality of client IP addresses based on the analysis of the stored information, wherein the confidence score is granular.

9. The method of claim 8 wherein the stored information includes IP addresses that are identified as malicious.

10. A method of mitigating an attack over the Internet, the method comprising:
collecting information related to a plurality of client IP addresses from a plurality of sources, the information comprising network traffic information, blacklist information, IP address to location mapping information, a number of connections information, and a time of connections information;
analyzing the collected information to determine confidence scores for the plurality of client IP addresses;
receiving network traffic from the Internet;
limiting network traffic from a first subset of the plurality of client IP addresses characterized by a confidence score less than a first threshold;
determining a level of the network traffic; and
in response to determining the level of network traffic, limiting network traffic from a second subset of the plurality of client IP addresses characterized by a confidence score less than a second threshold greater than the first threshold.

11. The method of claim 10 wherein limiting the network traffic comprises applying at least a four-level threshold to block a portion of the network traffic.

12. The method of claim 10 further comprising assigning a weighting to each of the plurality of sources prior to analyzing the collected information to determine confidence scores for the plurality of client IP addresses.

13. The method of claim 10 further comprising receiving data from a second source, wherein determining the confidence scores for the plurality of client IP addresses comprises aggregating the information and the data.

14. A system for controlling network traffic, comprising:
a central server containing data for a plurality of client machines, the data comprising network traffic information, blacklist information, IP address to location mapping information, a number of connections information, and a time of connections information, the data relating to a confidence score of each of the plurality of client machine;
a network server including a processor and non-transitory computer-readable memory containing instructions which, when executed on the processor, perform a method comprising:
receiving, at the network server, client machine data for a plurality of client machines;
determining a plurality of threshold values;
relating each of the plurality of threshold values to an action to be taken for request network traffic;
receiving a request associated with a client machine, wherein the association is determined using identification data found in the request;
determining, based on the data, a confidence score associated with the client machine; and
acting on the request based on the confidence score in relation to the threshold values and related actions to be taken.

15. The system of claim 14 wherein the threshold values are adjusted based on current network traffic information.

16. The system of claim 15 wherein the current network traffic information is evidence of an attack, and the adjusting increases the threshold values.

17. The system of claim 14 wherein an action related to one or more of the threshold values comprises at least one of: applying a rate limit to the requests by the client machine or performing an additional check on the request by a client IP network address associated with the request.

18. The system of claim 14 wherein the data relating to a confidence score received from the central server includes the confidence score.

19. The system of claim 14 wherein the confidence score is calculated at the network server based in part on the data received from the central server.

20. The system of claim 14 wherein the identification data comprises client IP addresses and wherein the identification data found in the request comprises a client IP address associated with the request.

21. A system of mitigating an attack over the Internet, comprising:
a processor; and
memory storing instructions, which when executed on a processor, perform a method comprising:
collecting information related to a plurality of client IP addresses from a plurality of sources, the information comprising network traffic information, blacklist information, IP address to location mapping information, a number of connections information, and a time of connections information;
analyzing the collected information to determine confidence scores for the plurality of client IP addresses;
receiving network traffic from the Internet;
limiting network traffic from a first subset of the plurality of client IP addresses characterized by a confidence score less than a first threshold;
determining a level of the network traffic; and in response to determining the level of network traffic, limiting network traffic from a second subset of the plurality of client IP addresses characterized by a confidence score less than a second threshold greater than the first threshold.

22. The system of claim 21 wherein limiting the network traffic comprises applying at least a four-level threshold to block a portion of the network traffic.

23. The system of claim 21 wherein the method further comprises:
   assigning a weighting to each of the plurality of sources prior to analyzing the collected information to determine confidence scores for the plurality of client IP addresses.

24. The system of claim 21 wherein the method further comprises:
   receiving data from a second source, wherein determining the confidence scores for the plurality of client IP addresses comprises aggregating the information and the data.

* * * * *